United States Patent
Miyamoto (10) Patent No.: US 10,878,263 B2
(45) Date of Patent: Dec. 29, 2020

(54) WEIGHT VALUE DETERMINATION FOR A COLLATION PROCESSING DEVICE, COLLATION PROCESSING METHOD, AND RECORDING MEDIUM WITH COLLATION PROCESSING PROGRAM STORED THEREIN

(71) Applicant: NEC Corporation, Tokyo (JP)

(72) Inventor: Takamichi Miyamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 27 days.

(21) Appl. No.: 16/467,126

(22) PCT Filed: Dec. 13, 2017

(86) PCT No.: PCT/JP2017/044644
§ 371 (c)(1),
(2) Date: Jun. 6, 2019

(87) PCT Pub. No.: WO2018/116918
PCT Pub. Date: Jun. 28, 2018

(65) Prior Publication Data
US 2020/0074203 A1  Mar. 5, 2020

(30) Foreign Application Priority Data
Dec. 19, 2016  (JP) ................. 2016-245167

(51) Int. Cl.
*G06K 9/00*  (2006.01)
(52) U.S. Cl.
CPC ..... *G06K 9/00993* (2013.01); *G06K 9/00885* (2013.01)
(58) Field of Classification Search
CPC ............ G06K 9/00993; G06K 9/00885
See application file for complete search history.

(56) References Cited

U.S. PATENT DOCUMENTS 9,661,334 B2 * 5/2017 Alain ................. H04N 19/176
9,684,814 B2 * 6/2017 Zhou ................... G06K 9/6215
(Continued)

FOREIGN PATENT DOCUMENTS

JP   H05-120486 A   5/1993
JP   2007-299186 A   11/2007
(Continued)

OTHER PUBLICATIONS

International Search Report for PCT Application No. PCT/JP2017/044644, dated Feb. 20, 2018.
(Continued)

*Primary Examiner* — Pakee Fang (57) ABSTRACT

This collation processing device 20 speeds up collation processing when characteristics indicated by characteristic points in a collation source and a collation destination are classified into any of characteristic types, by including: an acquisition unit 21 acquiring a weighting value 210 of collation indicating the degree of collation for each combination of characteristic types of the collation source and collation destination; a classification unit 22 classifying the characteristic points into groups, based on the weighting value 210; a representative value determination unit 23 determining, for each group, a representative value of the weighting value 210; a rough collation unit 24 performing collation per group, using the representative value; a determination unit 25 determining whether the collation result satisfies a determination criterion; and a fine collation unit 26 performing collation by using the weighting value 210, only when the determination criterion is satisfied.

10 Claims, 7 Drawing Sheets

(56) References Cited

U.S. PATENT DOCUMENTS

| | | | |
|---|---|---|---|
| 9,792,512 B2 * | 10/2017 | Matsunami | G06K 9/00067 |
| 2006/0136744 A1 * | 6/2006 | Lange | G06K 9/00536 |
| | | | 713/186 |
| 2012/0106807 A1 * | 5/2012 | Vitt | G06K 9/00993 |
| | | | 382/125 |
| 2013/0142405 A1 | 6/2013 | Nada et al. | |
| 2013/0336547 A1 * | 12/2013 | Komogortsev | A61B 5/117 |
| | | | 382/117 |
| 2014/0016830 A1 * | 1/2014 | Wang | G06K 9/6892 |
| | | | 382/115 |
| 2014/0016839 A1 | 1/2014 | Uno et al. | |

FOREIGN PATENT DOCUMENTS

| | | |
|---|---|---|
| WO | 2012/014308 A1 | 2/2012 |
| WO | 2012/090287 A1 | 7/2012 |

OTHER PUBLICATIONS

English translation of Written opinion for PCT Application No. PCT/JP2017/044644.

* cited by examiner

170 COLLATION WEIGHT INFORMATION

| COLLATION SOURCE CHARACTERISTIC TYPE \ COLLATION DESTINATION CHARACTERISTIC TYPE | 0 | 1 | 2 | 3 | 4 |
|---|---|---|---|---|---|
| 0 | 0 | 0 | 0 | 0 | 0 |
| 1 | 0 | 15 | -1 | -1 | -2 |
| 2 | 0 | -1 | 15 | -1 | -25 |
| 3 | 0 | -1 | -1 | 15 | -25 |
| 4 | 0 | -2 | -25 | -25 | 20 |

WEIGHT VALUE DETERMINATION FOR A COLLATION PROCESSING DEVICE, COLLATION PROCESSING METHOD, AND RECORDING MEDIUM WITH COLLATION PROCESSING PROGRAM STORED THEREIN

This application is a National Stage Entry of PCT/JP2017/044644 filed on Dec. 13, 2017, which claims priority from Japanese Patent Application 2016-245167 filed on Dec. 19, 2016, the contents of all of which are incorporated herein by reference, in their entirety.

TECHNICAL FIELD

The present invention relates to a technique for performing collation processing of determining whether a target as a collation source matches with a predetermined target as a collation destination.

BACKGROUND ART

Personal identification (biometric collation) using biometric information such as a face, a fingerprint, a palm print, an iris, and a vein has been widely used in various services provided by computer systems. In such biometric collation, for example, personal identification is made by performing one-to-N (N is an arbitrary natural number) collation between biometric information (collation source) of a person as an authentication target and biometric information (collation destinations) of a large number of persons previously registered in a database. In this case, since collation is performed concerning a large number of characteristic points included in the collation source and a large number of the collation destinations, there is a problem that a calculation amount in the collation increases, and thereby, time required for the collation increases. For this reason, expectation for a technique for efficiently performing collation processing has increased.

As a technique related to such a technique, in PTL 1, there is disclosed a character recognition device that extracts a plurality of types of characteristics from image information of a recognition-target character, successively compares the extracted characteristics with each characteristic of each of previously registered reference patterns, and determines a plurality of recognition candidates on the basis of a cumulative value of the comparison results (absolute values of the difference results) of a plurality of types of characteristics. Before comparing each characteristic of the recognition-target character with each characteristic of each reference pattern, the device estimates a cumulative value of the comparison results after the comparison. Then, the device compares the estimated value with a criterion value, and determines whether to continue subsequent processing based on the reference pattern or to stop the processing.

CITATION LIST

Patent Literature

[PTL 1] Japanese Unexamined Patent Application Publication No. H5(1993)-120486

SUMMARY OF INVENTION

Technical Problem

In the above-described biometric collation or the like, in order to efficiently perform collation processing, there is considered a method in which a characteristic represented by each characteristic point is defined as any of a plurality of characteristic types. In this method, depending on a combination of characteristic types concerning mutual characteristic points estimated to be at equivalent positions in collation targets (e.g., faces, fingerprints, palm prints, irises, veins, and the like) of a collation source and a collation destination, a value that indicates a weighting of collation for the combination of characteristic points is determined. Herein, the characteristic types are information that can classifies a direction (an up-down direction, a left-right direction, an oblique direction, or the like) of a line at a characteristic point arranged on a pattern such as a fingerprint, for example. In this method, a collation result (collation score) between a collation source and a collation destination is calculated as a sum of values indicating weightings of collation for all the characteristic points, for example in accordance with the equation 1.

$$\text{Collation Score} = \sum_{i=1}^{M} (\text{weight}[s[i]][f[i]]) \quad \text{[Equation 1]}$$

In the equation 1, M (M is an arbitrary natural number) indicates the number of characteristic points included in each collation target. In the equation 1, s[i] is a value indicating the characteristic type of the i-th characteristic point in the collation source, and f[i] is a value indicating the characteristic type of the i-th characteristic point in the collation destination. In the equation 1, "weight" is a function for, on the basis of the combination of s[i] and f[i], calculating a value indicating a weighting of collation.

Even in such a method in which a characteristic represented by each characteristic point is defined as any of a plurality of characteristic types, a speed of collation processing can be raised by early determining that a collation source and a collation destination are discrepancy each other, and thereby stopping the collation processing, similarly to the technique disclosed in PTL 1, for example. However, according to the method in which a characteristic represented by each characteristic point is defined as any of a plurality of characteristic types, it is difficult to estimate a cumulative value of comparison results as described in PTL 1. For this reason, according to the configuration disclosed in PTL 1, there is a problem that it is difficult to raise a speed of collation processing in the method in which a characteristic represented by each characteristic point is defined as any of a plurality of characteristic types. A main object of the present invention is to provide a collation processing device and the like for solving such a problem.

Solution to Problem

A collation processing device according to one aspect of the present invention includes: an acquisition means for acquiring a weighting value representing a degree of collation, for each combination of any of characteristic types in a collation source and any of characteristic types in a collation destination when, for each of a characteristic point included in the collation source and a characteristic point included in the collation destination, a certain characteristic is classified into any of a plurality of the characteristic types; a classification means for classifying the characteristic point into a group, based on the weighting value for a combination of the characteristic point included in the collation source and the characteristic point that is included in the collation destination and that is associated with the characteristic point in the collation source in collation; a representative value determination means for determining a representative value representing the weighting value for each of the groups; a rough collation means for performing collation as a unit of the group between the collation source and the collation destination by using the representative value; a determination means for determining whether a result of the collation performed by the rough collation means satisfies a determination criterion; and a fine collation means for performing collation between the collation source and the collation destination by using the weighting value for each of the characteristic points, only when the determination means determines that the determination criterion is satisfied.

From another standpoint for achieving the above-described object, a collation processing method according to one aspect of the present invention wherein, acquiring a weighting value representing a degree of collation, for each combination of any of characteristic types in a collation source and any of characteristic types in a collation destination when, for each of a characteristic point included in the collation source and a characteristic point included in the collation destination, a certain characteristic is classified into any of a plurality of the characteristic types; classifying the characteristic point into a group, based on the weighting value for a combination of the characteristic point included in the collation source and the characteristic point that is included in the collation destination and that is associated with the characteristic point in the collation source in collation; determining a representative value representing the weighting value for each of the groups; performing collation as a unit of the group between the collation source and the collation destination by using the representative value; determining whether a result of the collation between the collation source and the collation destination satisfies a determination criterion; and performing collation between the collation source and the collation destination by using the weighting value for each of the characteristic points, only when it is determined that the determination criterion is satisfied.

Further, from still another standpoint for achieving the above-described object, a collation processing program according to one aspect of the present invention is a program causing a computer to execute: acquisition processing of acquiring a weighting value representing a degree of collation, for each combination of any of characteristic types in a collation source and any of the characteristic types in a collation destination when, for each of a characteristic point included in the collation source and a characteristic point included in the collation destination, a certain characteristic is classified into any of a plurality of characteristic types; classification processing of classifying the characteristic point into a group, based on the weighting value for a combination of the characteristic point included in the collation source and the characteristic point that is included in the collation destination and that is associated with the characteristic point in the collation source in collation; representative value determination processing of determining a representative value representing the weighting value for each of the groups; rough collation processing of performing collation as a unit of the group between the collation source and the collation destination by using the representative value; determination processing of determining whether a result of the collation between the collation source and the collation destination satisfies a determination criterion; and fine collation processing of performing collation between the collation source and the collation destination by using the weighting value for each of the characteristic points, only when the determination processing determines that the determination criterion is satisfied.

Furthermore, the present invention can be implemented by a computer-readable nonvolatile recording medium with the collation processing program (computer program) stored therein.

Advantageous Effects of Invention

The present invention is able to raise a speed of collation processing, when characteristics represented by characteristic points included in a collation source and a collation destination are each classified into any of a plurality of characteristic types.

EXAMPLE EMBODIMENT

Hereinafter, example embodiments of the present invention are described in detail with reference to the drawings.

First Example Embodiment

Figure 1:
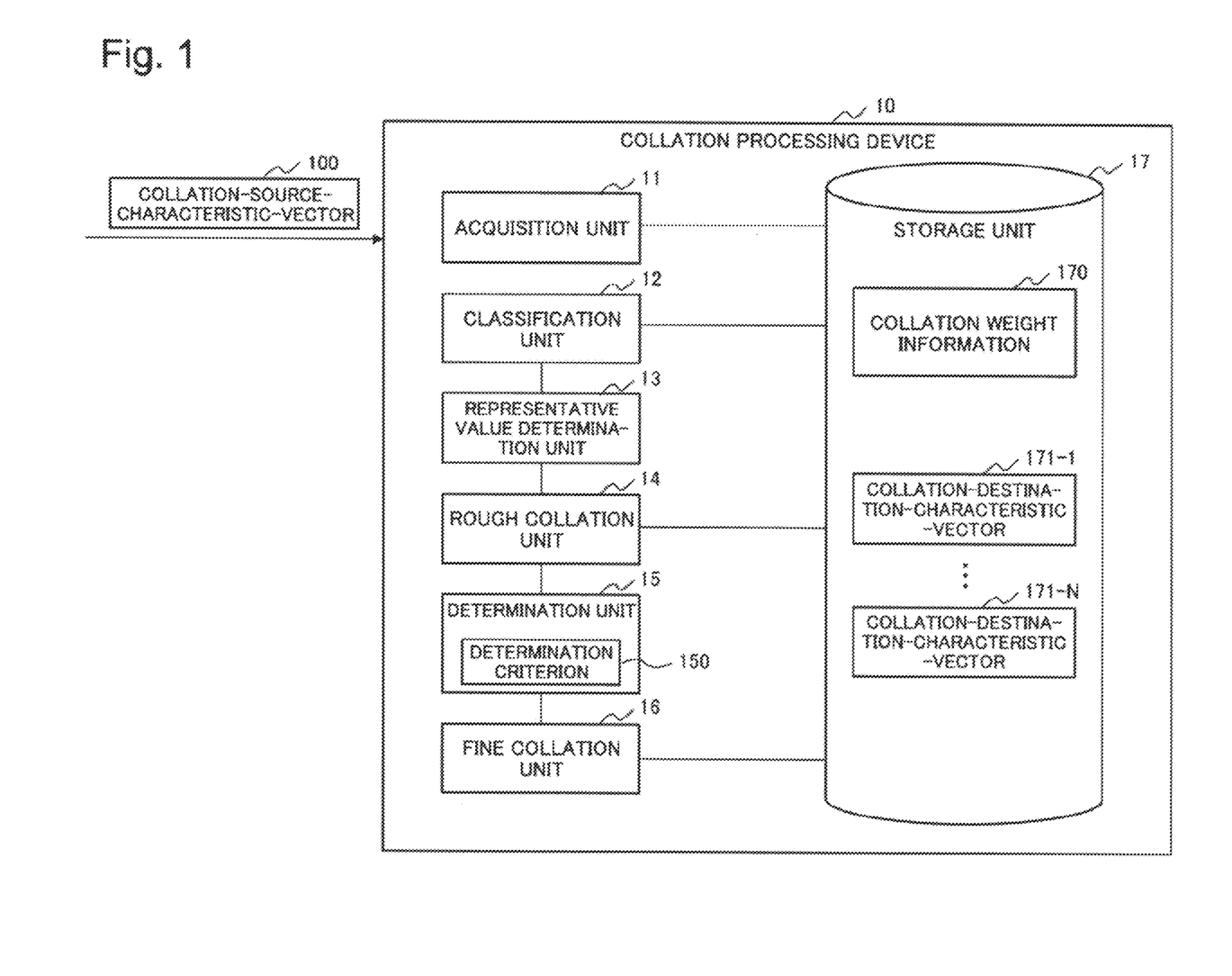
FIG. 1 is a block diagram illustrating a configuration of a collation processing device 10 according to a first example embodiment of the present invention.

FIG. 1 is a block diagram conceptually illustrating a configuration of a collation processing device 10 according to a first example embodiment of the present invention. The collation processing device 10 is a device that performs one-to-N collation of an input collation-source—characteristic-vector 100 with previously registered collation-destination-characteristic-vectors 171-1 to 171-N (N is an arbitrary natural number). The collation-source-characteristic-vector 100 is information indicating characteristics represented by M (M is an arbitrary natural number) characteristic points included in a target (hereinafter, simply referred to as "collation source" in some cases) as a collation source. The collation-destination-characteristic-vectors 171-1 to 171-N are information indicating characteristics represented by M characteristic points included in targets (hereinafter, simply referred to as "collation destinations" in some cases) as collation destinations.

For example, the collation processing device 10 may perform biometric collation between the collation-source-characteristic-vector 100 indicating biometric information such as a face, a fingerprint, a palm print, an iris, and a vein and the collation-destination-characteristic-vectors 171-1 to 171-N. Alternatively, the collation processing device 10 may be a device that performs collation (identification) of a thing by using a fine pattern (object fingerprint) naturally occurring on a surface of an industrial product or the like. The collation processing device 10 compares values indicating characteristics concerning mutual characteristic points (e.g., estimated to be at equivalent positions in the collation targets) associated with each other in the collation source and the collation destination, and thereby determines whether or not the collation source and the collation destination are the same target.

The collation processing device 10 according to the present example embodiment includes an acquisition unit 11, a classification unit 12, a representative value determination unit 13, a rough collation unit 14, a determination unit 15, a fine collation unit 16, and a storage unit 17.

The acquisition unit 11 acquires collation weight information 170 from an outside. When the characteristic is classified into any of a plurality of characteristic types for each characteristic point included in the collation source and the collation destination, the collation weight information 170 is information that represents a value indicating a weighting (weighting value) of collation for each combination of any of the characteristic types in the collation source and any of the characteristic types in the collation destination.

Figure 2:
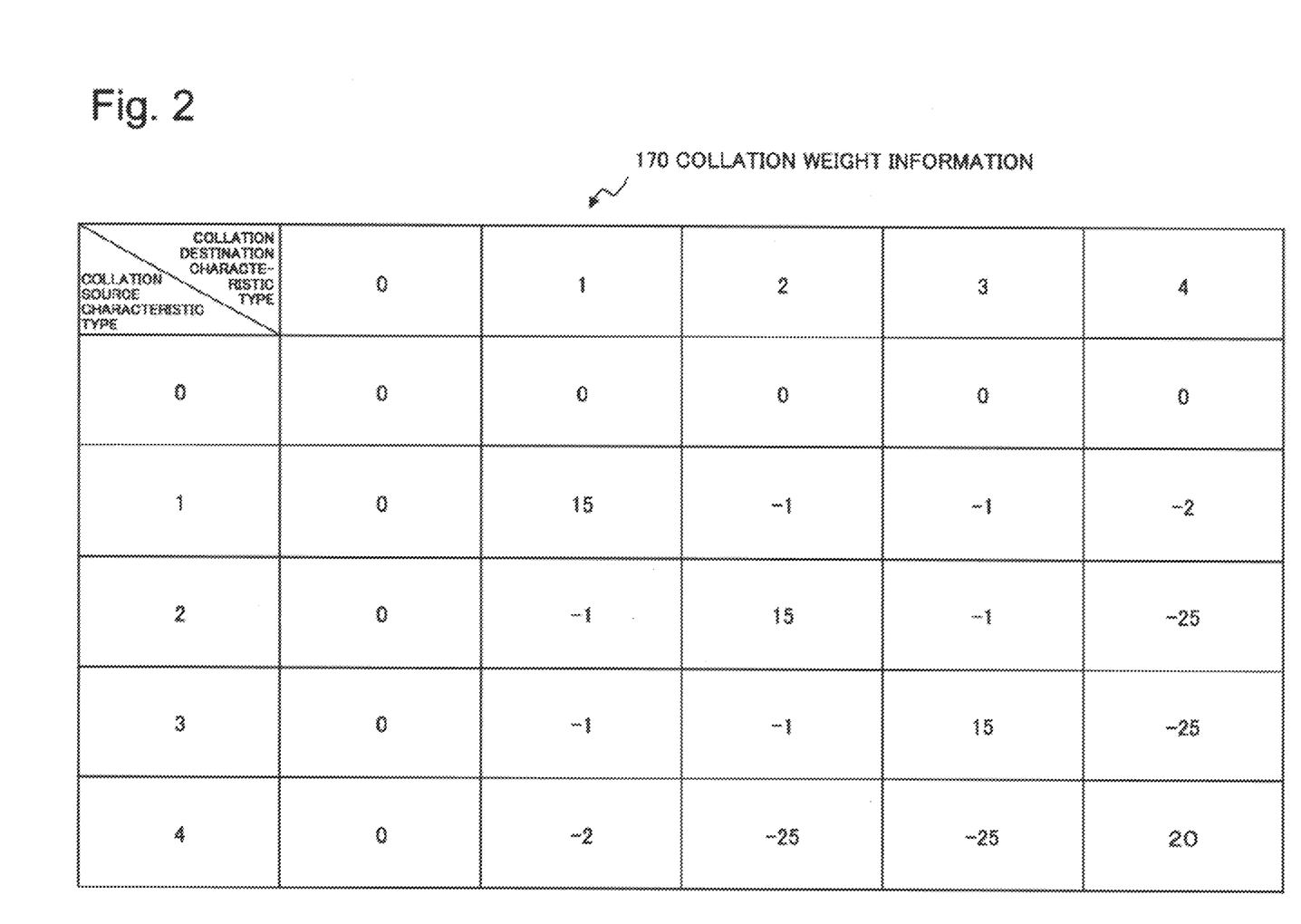
FIG. 2 is a diagram exemplifying a configuration of collation weight information 170 according to the first example embodiment of the present invention.

FIG. 2 is a diagram conceptually illustrating a configuration of the collation weight information 170 according to the present example embodiment. In the collation weight information 170 exemplified in FIG. 2, five types ("0" to "4") are defined as the characteristic types of the characteristic points included in the collation source and the collation destination. However, characteristic types defined in the collation weight information 170 are not limited to five types. It is assumed that values of the characteristic types are defined by directions (an up-down direction, a left-right direction, an oblique direction from the upper left to the lower right, an oblique direction from the lower left to the upper right, and the like) of ridges in an image representing a fingerprint or the like in the case of analyzing a plurality of the characteristic points arranged on a pattern in a general order, for example.

In the collation weight information 170 exemplified in FIG. 2, all of weighting values for the characteristic points whose characteristic type is "0" are "0". This indicates that a target on which collation is performed by the collation processing device 10 does not include characteristic points whose characteristic type is "0".

As exemplified in FIG. 2, for a combination (except for the case where the characteristic type is "0") of the characteristic points for which the characteristic type of the collation source and the characteristic type of the collation destination correspond to each other, a positive value whose absolute value is large, such as "15" or "20", is set as a weighting value. This is based on a matter that when the characteristic type of the collation source and the characteristic type of the collation destination correspond to each other for a certain characteristic point, a possibility that the collation source and the collation destination are the same target becomes higher.

Meanwhile, for example, for a combination of characteristic points for which the characteristic type of the collation source is "2" and the characteristic type of the collation destination is "4", a negative value whose absolute value is large, such as "−25", is set as a weighting value. This is based on a matter that when the characteristic type of the collation source is "2" and the characteristic type of the collation destination is "4" for a certain characteristic point, a possibility that the collation source and the collation destination are different targets becomes higher.

Further, for example, for a combination of characteristic points for which the characteristic type of the collation source is "1" and the characteristic type of the collation destination is "2", a value whose absolute value is small, such as "−1", is set as a weighting value. This is based on a matter that when the characteristic type of the collation source is "1" and the characteristic type of the collation destination is "2" for a certain characteristic point, there is a possibility that the collation source and the collation destination are the same target, and there is also a possibility that the collation source and the collation destination are different targets.

More specifically, for example, in the cases where the characteristic types indicate directions of lines at the characteristic points arranged on a pattern such as a fingerprint, when a combination of the characteristic types in the collation source and the collation destination are "the up-down direction" and "the left-right direction" for example, a possibility that the collation source and the collation destination are different targets is high since the characteristics represented by the characteristic points clearly differ between the collation source and the collation destination. In contrast to this, when a combination of the characteristic types in the collation source and the collation destination are "the up-down direction" and "the oblique direction from the upper left to the lower right" for example, there is a possibility that the collation source and the collation destination are the same target, and there is also a possibility that the collation source and the collation destination are different targets since it cannot be said in consideration of an input error of biometric information or the like that the mutual characteristics represented by the characteristic points associated with each other clearly differ between the collation source and the collation destination.

The acquisition unit 11 illustrated in FIG. 1 stores the acquired collation weight information 170 in the storage unit 17. The storage unit 17 is a storage device such as a magnetic disk and an electronic memory, for example.

On the basis of weighting values indicated by the collation weight information 170 stored in the storage unit 17, the classification unit 12 determines a method for classifying into a group a combination of the characteristic point of the collation source and the characteristic point of the collation destination.

Figure 3:
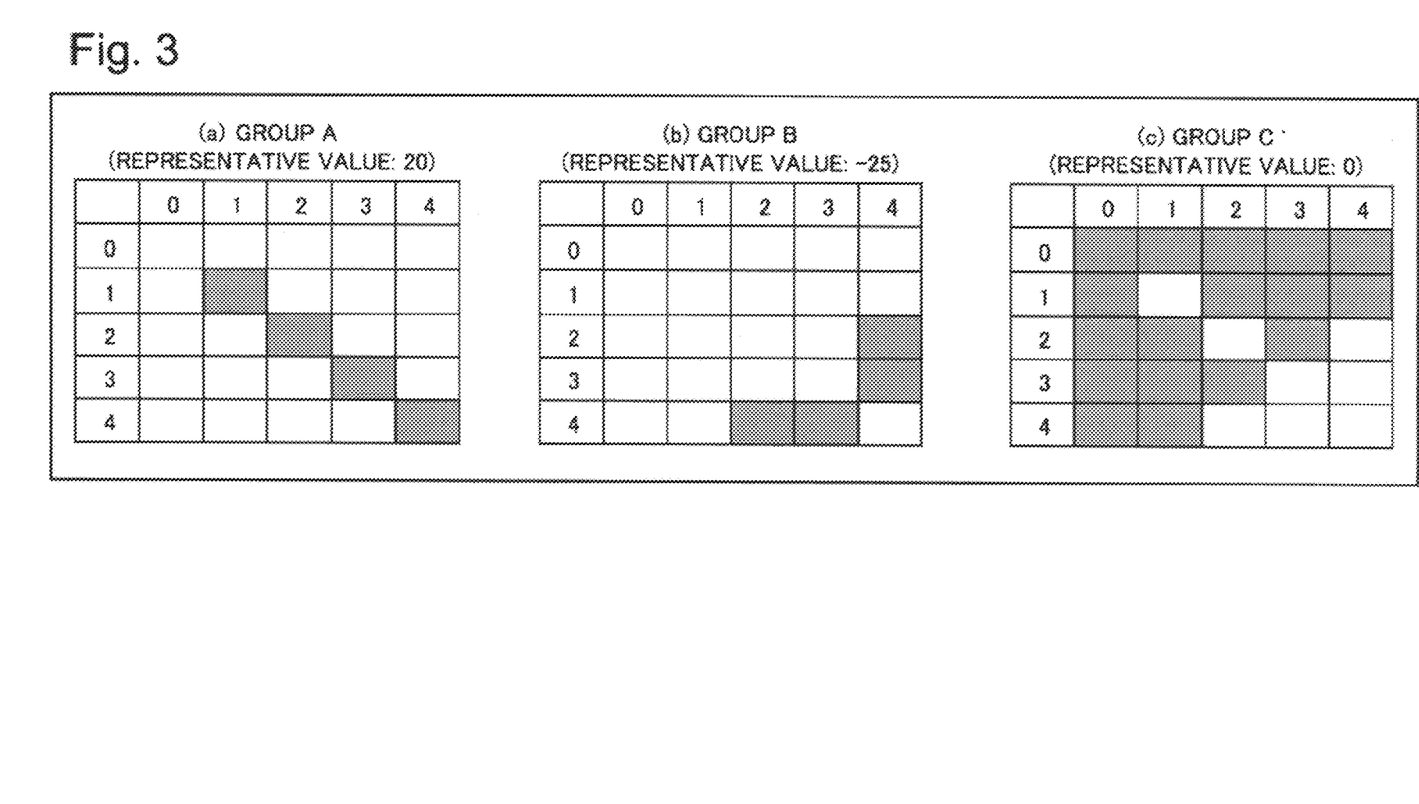
FIG. 3 is a diagram exemplifying a method in which a classification unit 12 according to the first example embodiment of the present invention classifies characteristic points into groups on the basis of the collation weight information 170.

FIG. 3 is a diagram exemplifying a method in which the classification unit 12 according to the present example embodiment classifies into a group a combination of a characteristic point of a collation source and a characteristic point of a collation destination, on the basis of the collation weight information 170 exemplified in FIG. 2. As exemplified in FIG. 3, the classification unit 12 classifies characteristic points into three groups (groups A, B, and C). As exemplified in FIG. 3(a), the group A is a group including characteristic points for which positive values having large absolute values ("15" and "20" illustrated in FIG. 2) are set as weighting values. As exemplified in FIG. 3(b), the group B is a group including characteristic points for which negative values having large absolute values ("−25" illustrated in FIG. 2) are set as weighting values. As exemplified in FIG. 3(c), the group C is a group including characteristic points for which values having small absolute values ("0", "−1", and "−2" illustrated in FIG. 2) are set as weighting values.

When the collation processing device 10 collates the collation-source-characteristic-vector 100 with any of the collation-destination-characteristic-vectors 171-i (i is any of integers from 1 to N), the classification unit 12 classifies into any of the above-described groups A, B, and C a combination of the mutual characteristic points that are included in the collation-source-characteristic-vector-100 and the collation-destination-characteristic-vectors 171-i and that are estimated to be at the similar positions in the targets.

Alternatively, the classification unit 12 may classify into groups the characteristic points included in the collation source or the collation destination, by using a well-known clustering method such as the k-means method, for example.

The representative value determination unit 13 illustrated in FIG. 1 determines a representative value representing weighting values for each of the groups into which the classification is performed by the classification unit 12. In the example illustrated in FIG. 3, the representative value determination unit 13 determines the representative values for the groups A, B, and C as "20", "−25", and "0" in this order. For each of the groups, the representative value determination unit 13 may determine the maximum value of the weighting values, the minimum value of the weighting values, an average value of the weighting values, or the like, for example, as the representative value of the group.

The rough collation unit 14 illustrated in FIG. 1 acquires the number of the combinations of the characteristic points of the collation source and the characteristic points of the collation destination that belong to each of the groups into which the classification is performed by the classification unit 12. The rough collation unit 14 calculates, for each of the groups, a product of the acquired number and the representative value determined by the representative value determination unit 13, and calculates the sum concerning the products for all the groups as a rough value of a collation score.

For example, it is assumed that the characteristic points are classified into the groups by the classification unit 12 as exemplified in FIG. 3, the number M of characteristic points included in each of the collation source and the collation destination is 100, the numbers of the combinations of the characteristic points belonging to the groups A, B, and C are 8, 10, and 82 in this order, and the representative values for the groups A, B, and C are "20", "−25", and "0" in this order. In this case, the rough collation unit 14 makes calculation of "20×8+(−25)×10+0×82", thereby calculating, as the rough value of the collation score, "−90" that is the sum of all the above-described groups. In the above-mentioned calculation equation, "×" is an operator indicating multiplication, and "+" is an operator indicating addition.

The determination unit 15 illustrated in FIG. 1 determines whether or not the rough value of the collation score calculated by the rough collation unit 14 satisfies a determination criterion 150. For example, the determination criterion 150 is stored in a memory or the like included in the determination unit 15. When the determination criterion 150 is a matter of "a rough value of a collation score is larger than a threshold (e.g., "0")" for example, the determination unit 15 determines that the rough value of the collation score does not satisfy the determination criterion 150, because of the rough value of the collation score being "−90", in the above-described example. The determination criterion 150 may be input from an outside by a user for example.

When the determination unit 15 determines that a rough value of a collation score calculated by the rough collation unit 14 satisfies the determination criterion 150, the fine collation unit 16 performs fine collation between the collation-source-characteristic-vector 100 and the collation-destination-characteristic-vector 171-i by using a weighting value that is indicated for each characteristic point by the collation weight information 170. In other words, in this case, the fine collation unit 16 calculates a fine collation score between the collation source and the collation destination as the sum of weighting values for all characteristic points by using the above-described equation 1 for example. When the determination unit 15 determines that a rough value of a collation score calculated by the rough collation unit 14 does not satisfy the determination criterion 150, the fine collation unit 16 regards a collation source as being not identical to a collation destination, and stops fine collation between the collation-source-characteristic-vector 100 and the collation-destination-characteristic-vector 171-i.

The fine collation unit 16 specifies a collation destination whose fine collation score is the highest among those of collation destinations that are each indicated by the collation-destination-characteristic-vector 171-i for which the determination unit 15 determines that a rough value of a collation score satisfies the determination criterion 150.

Figure 4A:
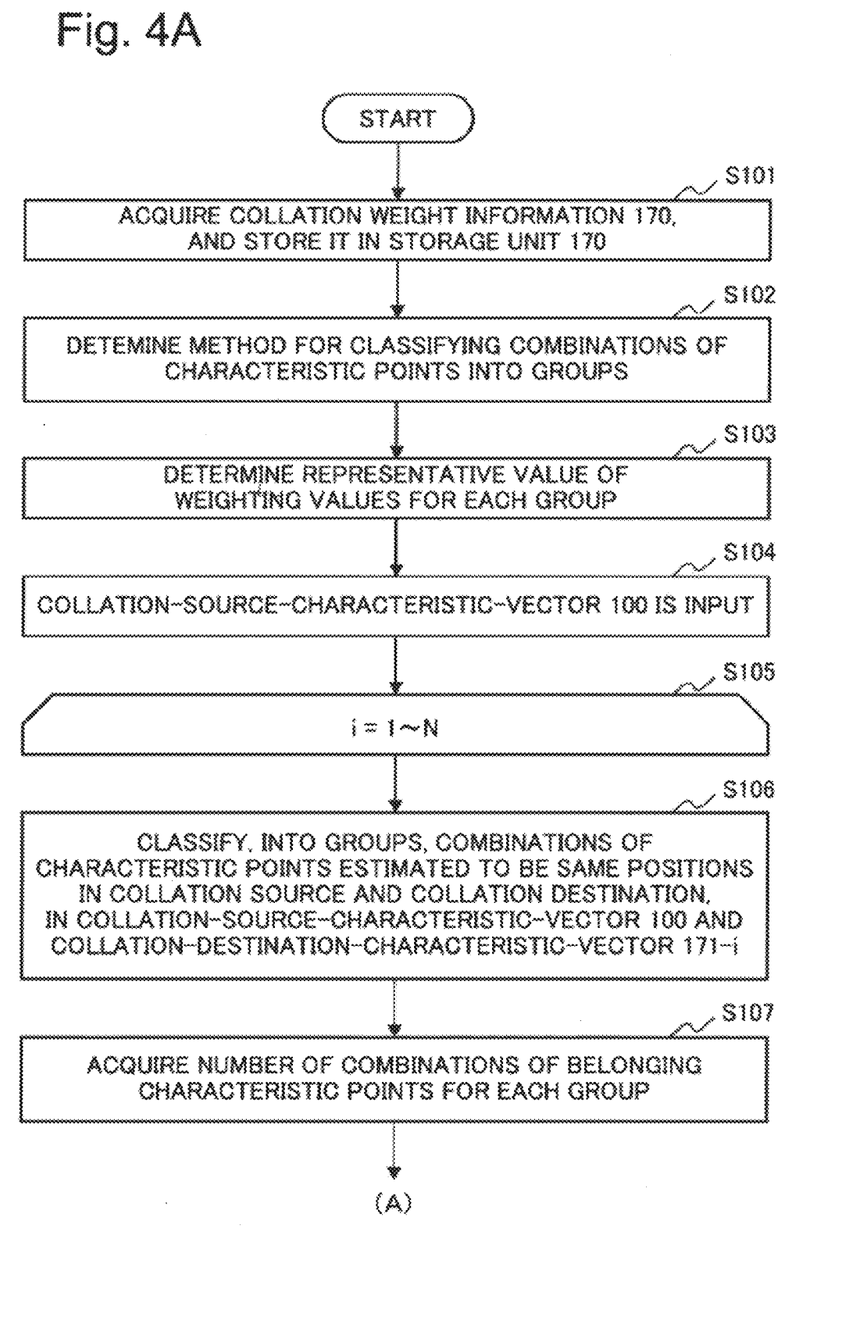
FIG. 4A is a flowchart (1/2) illustrating an operation of the collation processing device 10 according to the first example embodiment of the present invention.
Figure 4B:
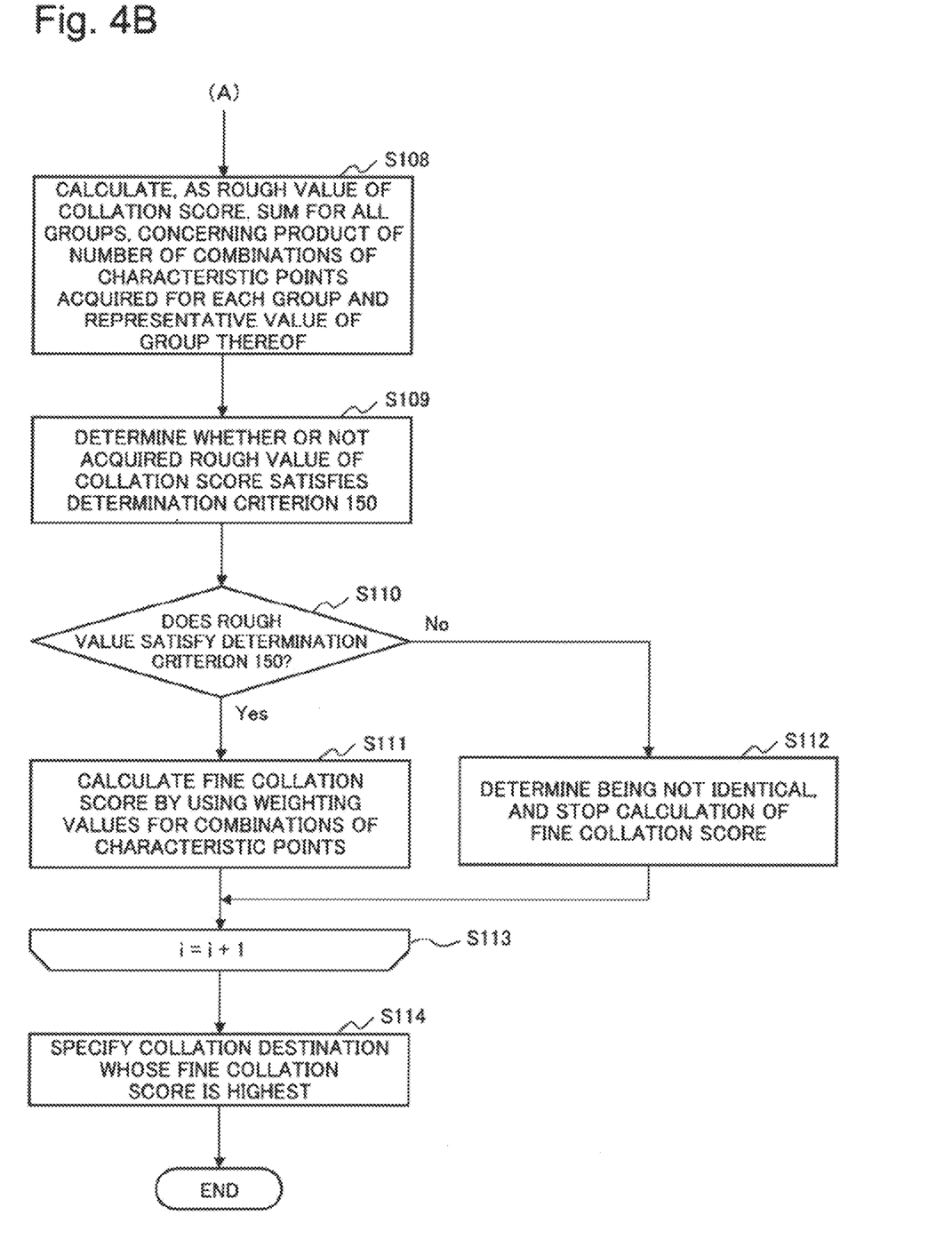
FIG. 4B is a flowchart (2/2) illustrating the operation of the collation processing device 10 according to the first example embodiment of the present invention.

Next, an operation (processing) of the collation processing device 10 according to the present example embodiment is described in detail with reference to flowcharts of FIGS. 4A and 4B.

The acquisition unit 11 acquires the collation weight information 170 from an outside, and stores the acquired collation weight information 170 in the storage unit 17 (step S101). On the basis of the collation weight information 170, the classification unit 12 determines a method for classifying into a group a combination of a characteristic point of a collation source and a characteristic point of a collation destination (step S102). The representative value determination unit 13 determines a representative value of weighting values for each of the groups (step S103). The collation-source-characteristic-vector 100 is input to the collation processing device 10 (step S104).

The collation processing device 10 repeatedly performs processing from the step S106 to the step S112 while changing a variable i from one to N (step S105).

The classification unit 12 classifies, into a group, a combination of characteristic points estimated to be the same position in the collation source and the collation destination in the collation-source-characteristic-vector 100 and the collation-destination-characteristic-vector 171-i stored in the storage unit 17 (step S106). For each of the groups, the rough collation unit 14 acquires the number of the combinations of the characteristic points belonging to the group (step S107).

The rough collation unit 14 calculates as a rough value of a collation score the sum concerning products for all the groups, the product being a product of the number of the combinations of the characteristic points acquired for each of the groups and the representative value of the group (step S108). The determination unit 15 determines whether or not the rough value of the collation score calculated by the rough collation unit 14 satisfies the determination criterion 150 (step S109).

When the rough value of the collation score satisfies the determination criterion 150 (Yes at the step S110), the fine collation unit 16 calculates a fine collation score by using a weighting value for each combination of the characteristic points (step S111). When the rough value of the collation score does not satisfy the determination criterion 150 (No at the step S110), the fine collation unit 16 determines that the collation source and the collation destination are not identical to each other, and stops calculation of a fine collation score (step S112).

When a variable i is smaller than N, the collation processing device 10 adds one to the variable i, and performs processing from the step S106, and when a variable i is N, the collation processing device 10 performs processing of the step S114 (step S113). The collation processing device 10 specifies the collation destination whose fine collation score is the highest (step S114), and the entire processing is ended.

The collation processing device 10 according to the present example embodiment is able to raise a speed of collation processing when a characteristic of each of characteristic points included in a collation source and a collation destination is classified into any of a plurality of characteristic types. The reason is that the collation processing device 10 classifies into a group a combination of the characteristic point of the collation source and the characteristic point of the collation destination, and stops fine collation when determining that fine collation is unnecessary on the basis of a rough value of a collation score calculated from a representative value of weighting values for each of the groups and the number of the characteristic points belonging to the group.

Hereinafter, detailed description is made on an advantageous effect achieved by the collation processing device 10 according to the present example embodiment.

In biometric collation or the like, there is considered a method in which a characteristic represented by each characteristic point is defined as any of a plurality of characteristic types in order to efficiently perform collation processing. In this method, depending on a combination of the characteristic types concerning the mutual characteristic points estimated to be at the similar positions in collation targets of a collation source and a collation destination, a weighting value is determined for the combination of the characteristic points. Then, in this method, a collation result (collation score) between the collation source and the collation destination is calculated as the sum of the weighting values for all the characteristic points, as expressed in the above-described equation 1 for example. In this case, depending on the number M of characteristic points and the number N of collation destinations for example, a calculation amount required for one-to-N collation processing increases, and for this reason, a subject is that calculation required for collation processing is performed efficiently.

For such a problem, the collation processing device 10 according to the present example embodiment includes the acquisition unit 11, the classification unit 12, the representative value determination unit 13, the rough collation unit 14, the determination unit 15, and the fine collation unit 16. In other words, when, for each of characteristic points included in a collation source and characteristic points included in a collation destination, a certain characteristic is classified into any of a plurality of the characteristic types, the acquisition unit 11 acquires the collation weight information 170 including a weighting value that indicates a degrees of collation for each combination of any of a plurality of the characteristic types in the collation source and any of a plurality of the characteristic types in the collation destination. On the basis of the weighting value for the combination of the characteristic point included in the collation source and the characteristic point that is associated with this characteristic point in the collation and that is included in the collation destination, the classification unit 12 classifies the characteristic points into a group. For each of the groups, the representative value determination unit 13 determines a representative value that represents the weighting values. By using the representative values, the rough collation unit 14 performs collation between the collation source and the collation destination in units of groups. The determination unit 15 determines whether or not the result of the collation performed by the rough collation unit 14 satisfies the determination criterion 150. Only when the determination unit 15 determines that the determination criterion 150 is satisfied, the fine collation unit 16 performs collation between the collation source and the collation destination by using the weighting value for each of the characteristic points.

Accordingly, the collation processing device 10 according to the present example embodiment calculates a rough value of a collation score in the collation between the collation source and the collation destination by treating the group as a unit, and then stops fine collation between the collation source and the collation destination when the rough value does not satisfy the determination criterion. Thereby, the collation processing device 10 according to the present example embodiment is able to raise a speed of collation processing when a characteristic represented by each of characteristic points included in a collation source and a collation destination is classified into any of a plurality of characteristic types.

Further, the classification unit 12 according to the present example embodiment classifies characteristic points included in a collation source or a collation destination into three groups for example. The first group (group A) among them is a group in which weighting values are equal to or larger than a predetermined positive value ("15" in the present example embodiment). The second group (group B) is a group in which weighting values are equal to or smaller than a predetermined negative value ("−25" in the present example embodiment).

The third group (group C) is a group in which weighting values ("0", "−1", and "−2" in the present example embodiment) belong to neither of the first and second groups. In this case, in the above-described first example embodiment, the determination criterion 150 is represented by the following equation 2.

$$20 \times Na + (-25) \times Nb + 0 \times Nc \geq 0 \qquad \text{[Equation 2]}$$

In the equation 2, Na, Nb, and Nc are the numbers of combinations of the characteristic points of the collation source and the characteristic points of the collation destination that belong to the group A, the group B, and the group C in this order.

By transforming the equation 2, the determination criterion 150 is represented by the equation 3.

$$Na/Nb \geq 1.25 \qquad \text{[Equation 3]}$$

Accordingly, on the basis of the determination criterion 150 represented by a simple mathematical expression as exemplified by the equation 3, the collation processing device 10 according to the present example embodiment is able to determine whether or not to perform fine collation between the collation source and the collation destination, and is able to thereby raise a speed of collation processing.

Furthermore, the representative value determination unit 13 according to the present example embodiment determines, as a representative value, the maximum value of weighting values, the minimum value of weighting values, or an average value of weighting values. Therefore, the collation processing device 10 according to the present example embodiment is able to change, depending on collation contents, a procedure of determining the representative value, and for this reason, is able to perform flexible collation.

In addition, the determination unit 15 according to the present example embodiment can use the determination criterion 150 input from an outside by a user or the like. Thereby, in the collation processing device 10 according to the present example embodiment, a condition that enables increase of a probability of not performing fine collation while maintaining accuracy of collation can be set as the determination criterion 150 by user operation, and thus, a speed of collation processing is able to be further raised.

Second Example Embodiment

Figure 5:
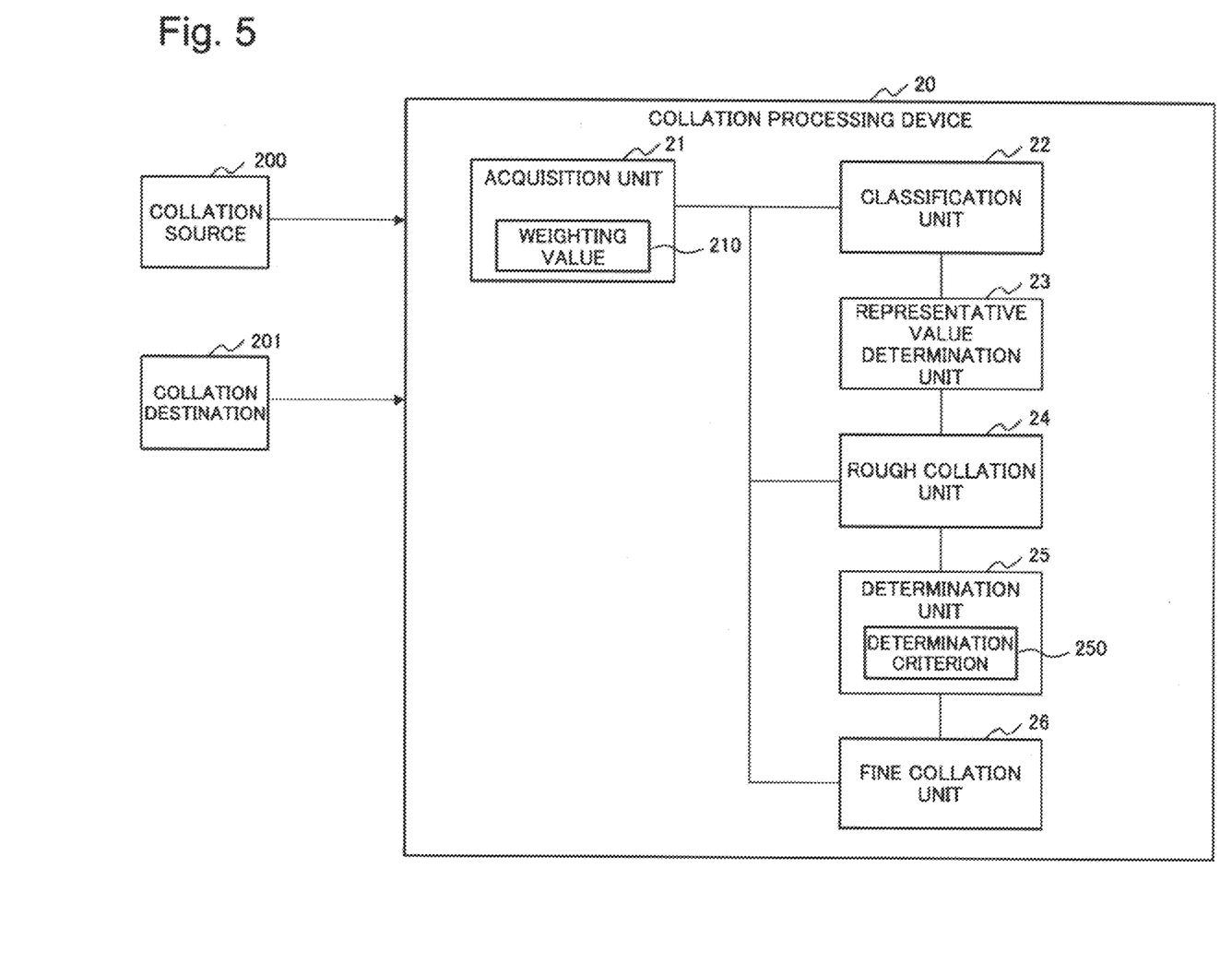
FIG. 5 is a block diagram illustrating a configuration of a collation processing device 20 according to a second example embodiment of the present invention.

FIG. 5 is a block diagram conceptually illustrating a configuration of a collation processing device 20 according to a second example embodiment of the present invention.

The collation processing device 20 according to the present example embodiment includes an acquisition unit 21, a classification unit 22, a representative value determination unit 23, a rough collation unit 24, a determination unit 25, and a fine collation unit 26.

The acquisition unit 21 acquires weighting values 210. When, for each of characteristic points included in a collation source 200 and characteristic points included in a collation destination 201, a certain characteristic is classified into any of a plurality of characteristic types, the weight value 210 is a value representing a degree of collation for each combination of any of the characteristic types in the collation source 200 and any of the characteristic types in the collation destination 201.

On the basis of the weighting value 210 for the combination of the characteristic point included in the collation source 200 and the characteristic point that is associated with this characteristic point in the collation source 200 in the collation and that is included in the collation destination 201, the classification unit 22 classifies the characteristic points into a group.

The representative value determination unit 23 determines a representative value that represents the weighting value 210 for each of the groups.

By using the representative values, the rough collation unit 24 performs collation as a unit of the group between the collation source 200 and the collation destination 201.

The determination unit 25 determines whether or not the result of the collation performed by the rough collation unit 24 satisfies a determination criterion 250.

Only when the determination unit 25 determines that the determination criterion 250 is satisfied, the fine collation unit 26 performs fine collation between the collation source 200 and the collation destination 201 by using the weighting value 210 for each characteristic point.

The collation processing device 20 according to the present example embodiment is able to raise a speed of collation processing when a characteristic represented by each of characteristic points included in a collation source and a collation destination is classified into any of a plurality of characteristic types. The reason is that the collation processing device 20 classifies into a group a combination of the characteristic point of the collation source and the characteristic point of the collation destination, performs collation in units of groups by using a representative value of weighting values for each of the groups, and stops fine collation when determining that fine collation is unnecessary on the basis of the collation result.

<Example of Hardware Configuration>

Each unit in the collation processing devices 10 and 20 illustrated in FIG. 1 and FIG. 5 in the above-described respective example embodiments can be implemented by dedicated hardware (HW) (electronic circuit). In addition, in FIG. 1 and FIG. 5, at least the following constituents can be regarded as function (processing) units (software modules) of a software program.

The acquisition units 11 and 21
The classification units 12 and 22
The representative value determination units 13 and 23
The rough collation units 14 and 24
The determination units 15 and 25
The fine collation units 16 and 26

However, the respective units illustrated in these drawings are divided as configurations for convenience of the description, and various configurations can be supposed for implementation. One example of the hardware environment in this case is described with reference to FIG. 6.

Figure 6:
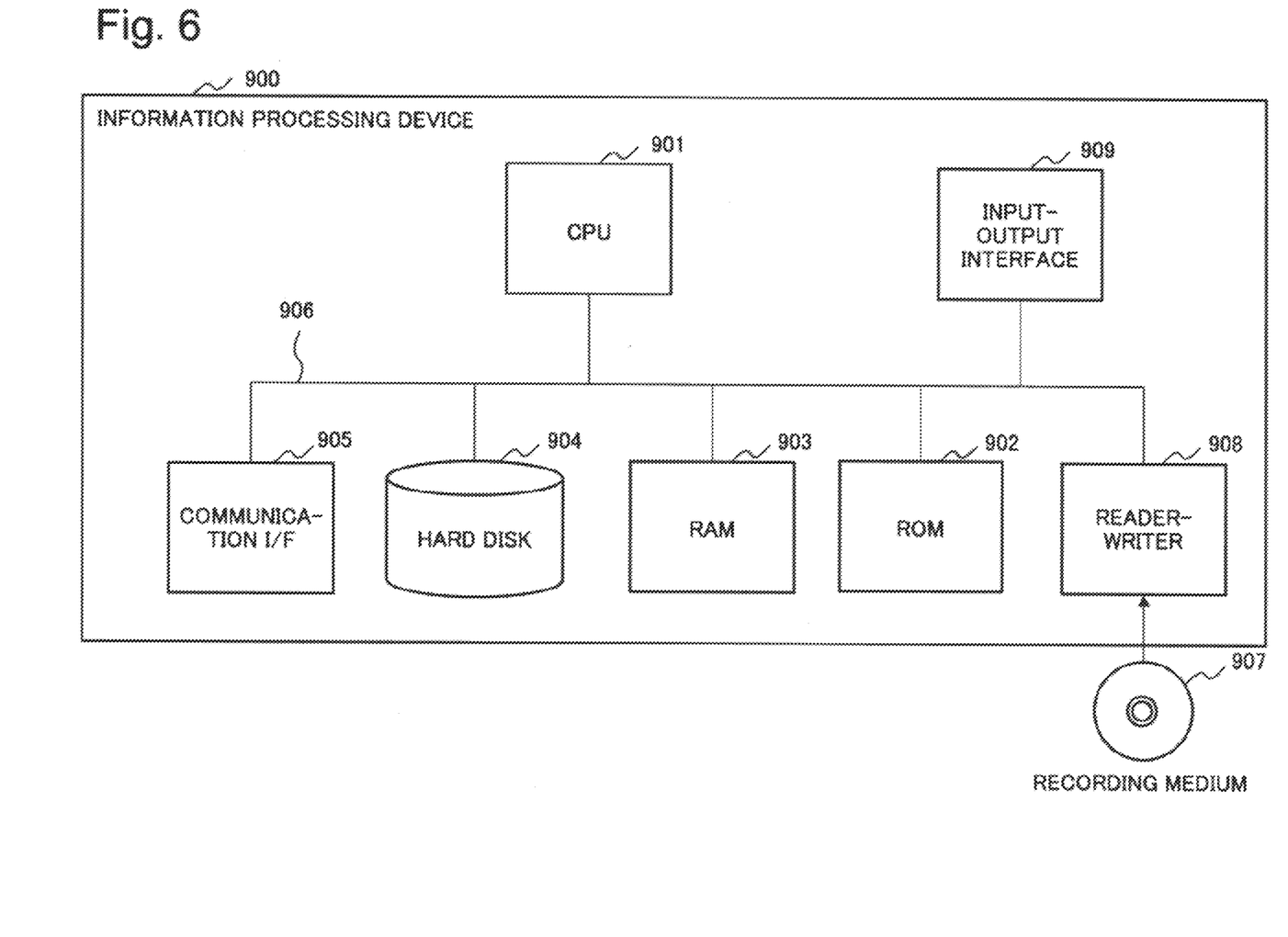
FIG. 6 is a block diagram illustrating a configuration of an information processing device 900 that can implement the collation processing device according to each of the example embodiments of the present invention.

FIG. 6 is a diagram exemplarily illustrating a configuration of an information processing device 900 (computer) that can implement the collation processing device according to each of the example embodiments of the present invention. In other words, FIG. 6 illustrates a configuration of the computer (information processing device) that can implement the collation processing device illustrated in FIG. 1 or FIG. 5, or a part thereof, and represents a hardware environment that can implement the respective functions in the above-described example embodiment. The information processing device 900 illustrated in FIG. 6 includes the following constituent elements.

A central processing unit (CPU) 901
A read-only memory (ROM) 902
A random access memory (RAM) 903
A hard disk (storage device) 904
A communication interface 905 with an external device such as a wireless transmission-reception unit
A bus 906 (communication line)
A reader-writer 908 capable of reading stored data from and writing data in a recording medium 907 such as a compact disc read-only memory (CD-ROM)
An input-output interface 909

In other words, the information processing device 900 including the above-described constituent elements is a general computer in which these constituents are connected to each other via the bus 906. The information processing device 900 may include a plurality of the CPUs 901 in some cases, or may include the CPU 901 constituted by multiple cores in other cases.

The present invention described by exemplifying the above-described example embodiments provides, to the information processing device 900 illustrated in FIG. 6, a computer program that can implement the following function. The function is a function of the above-described configuration in the block configuration diagram (FIG. 1 or FIG. 5) referred to in the description of the example embodiment, or the flowcharts (FIG. 4A and FIG. 4B). The computer program is then read out to the CPU 901 of the hardware, and is interpreted and executed whereby the present invention is achieved. Further, the computer program provided in the device may be stored in a readable and writable volatile memory (the RAM 903) or a nonvolatile storage device such as the ROM 902 or the hard disk 904.

Further, in the above-described case, as a method for providing the computer program in the hardware, a general procedure can be adopted at present. Examples of the procedure include a method for installing in the device via various recording media 907 such as a CD-ROM, a method for downloading from an outside via a communication line such as the Internet, and the like. In such a case, the present invention can be regarded as being constituted by codes that constitute the computer program or the recording medium 907 that stores the codes.

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

This application is based upon and claims the benefit of priority from Japanese patent application No. 2016-245167, filed on Dec. 19, 2016, the disclosure of which is incorporated herein in its entirety by reference.

REFERENCE SIGNS LIST

10 Collation processing device
100 Collation-source-characteristic-vector
11 Acquisition unit
12 Classification unit
13 Representative value determination unit
14 Rough collation unit
15 Determination unit
150 Determination criterion
16 Fine collation unit
17 Storage unit
170 Collation weight information
171-1 to 171-N Collation-destination-characteristic-vector
20 Collation processing device
200 Collation source
201 Collation destination
21 Acquisition unit
210 Weighting value
22 Classification unit
23 Representative value determination unit
24 Rough collation unit
25 Determination unit
250 Determination criterion
26 Fine collation unit
900 Information processing device
901 CPU
902 ROM
903 RAM
904 Hard disk (storage device)
905 Communication interface
906 Bus
907 Recording medium
908 Reader-writer
909 Input-output interface

What is claimed is:

1. A collation processing device comprising:
    an acquisition unit configured to acquire a weighting value representing a degree of collation, for each combination of any of characteristic types in a collation source and any of characteristic types in a collation destination when, for each of a characteristic point included in the collation source and a characteristic point included in the collation destination, a certain characteristic is classified into any of a plurality of the characteristic types;
    a classification unit configured to classify the characteristic point into a group, based on the weighting value for a combination of the characteristic point included in the collation source and the characteristic point that is included in the collation destination and that is associated with the characteristic point in the collation source in collation;
    a representative value determination unit configured to determine a representative value representing the weighting value for each of the groups;
    a rough collation unit configured to perform collation as a unit of the group between the collation source and the collation destination by using the representative value;
    a determination unit configured to determine whether a result of the collation performed by the rough collation unit satisfies a determination criterion; and
    a fine collation unit configured to perform collation between the collation source and the collation destination by using the weighting value for each of the characteristic points, only when the determination unit determines that the determination criterion is satisfied.

2. The collation processing device according to claim 1, wherein
    the rough collation unit acquires a number of the characteristic points that belong to each of the groups and that are included in the collation source or the collation destination, and then acquires a sum for all the groups, concerning a product of the number of the characteristic points and the representative value that are acquired for each of the groups, and
    the determination unit determines whether the sum is equal to or larger than a threshold value.

3. The collation processing device according to claim 1, wherein
    the classification unit classifies the characteristic points included in the collation source or the collation destination into a first group in which the weighting value is equal to or larger than a predetermined positive value, a second group in which the weighting value is equal to or smaller than a predetermined negative value, or a third group in which the weighting value belongs to neither of the first and second groups.

4. The collation processing device according to claim 1, wherein,
    by using a clustering method including a k-means method, the classification unit classifies, into the group, the characteristic point included in the collation source or the collation destination.

5. The collation processing device according to claim 1, wherein
    the representative value determination unit determines a maximum value of the weighting value, a minimum value of the weighting value, or an average value of the weighting value, as the representative value.

6. The collation processing device according to claim 1, wherein
    the determination unit uses the determination criterion input from an outside.

7. The collation processing device according to claim 1, further comprising:
    a storage unit configured to store the weighting value acquired by the acquisition unit, and a plurality of collation-destination-characteristic-vectors indicating characteristics represented by characteristic points included in a plurality of the collation destinations, wherein, the fine collation unit collates the plurality of collation-destination-characteristic-vectors with a collation-source-characteristic-vector indicating the characteristic represented by the characteristic point included in the collation source.

8. The collation processing device according to claim 7, wherein the collation-source-characteristic-vector and the collation-destination-characteristic-vectors indicate biometric information that represents a fingerprint, a palm print, an iris, a vein, or a face.

9. A collation processing method comprising, by an information processing device:

acquiring a weighting value representing a degree of collation, for each combination of any of characteristic types in a collation source and any of characteristic types in a collation destination when, for each of a characteristic point included in the collation source and a characteristic point included in the collation destination, a certain characteristic is classified into any of a plurality of the characteristic types;

classifying the characteristic point into a group, based on the weighting value for a combination of the characteristic point included in the collation source and the characteristic point that is included in the collation destination and that is associated with the characteristic point in the collation source in collation;

determining a representative value representing the weighting value for each of the groups;

performing collation as a unit of the group between the collation source and the collation destination by using the representative value;

determining whether a result of the collation between the collation source and the collation destination satisfies a determination criterion; and performing collation between the collation source and the collation destination by using the weighting value for each of the characteristic points, only when it is determined that the determination criterion is satisfied.

10. A non-transitory computer-readable recording medium with a collation processing program stored therein, the program causing a computer to execute: acquisition processing of acquiring a weighting value representing a degree of collation, for each combination of any of characteristic types in a collation source and any of characteristic types in a collation destination when, for each of a characteristic point included in the collation source and a characteristic point included in the collation destination, a certain characteristic is classified into any of a plurality of the characteristic types;

classification processing of classifying the characteristic point into a group, based on the weighting value for a combination of the characteristic point included in the collation source and the characteristic point that is included in the collation destination and that is associated with the characteristic point in the collation source in collation; representative value determination processing of determining a representative value representing the weighting value for each of the groups; rough collation processing of performing collation as a unit of the group between the collation source and the collation destination by using the representative value; determination processing of determining whether a result of the collation performed by the rough collation processing satisfies a determination criterion; and fine collation processing of performing collation between the collation source and the collation destination by using the weighting value for each of the characteristic points, only when the determination processing determines that the determination criterion is satisfied.

* * * * *